(12) United States Patent
Dowling et al.

(10) Patent No.: US 7,006,107 B2
(45) Date of Patent: Feb. 28, 2006

(54) ANISOTROPIC ANTI-ALIASING

(75) Inventors: Terence S. Dowling, San Jose, CA (US); R. David Arnold, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 126 days.

(21) Appl. No.: 10/440,013

(22) Filed: May 16, 2003

(65) Prior Publication Data

US 2004/0227770 A1 Nov. 18, 2004

(51) Int. Cl.
*G09G 5/00* (2006.01)
*G06K 9/40* (2006.01)

(52) U.S. Cl. .................................. 345/611; 382/269
(58) Field of Classification Search ................ 345/611, 345/613, 614, 428; 382/269
See application file for complete search history.

(56) References Cited

U.S. PATENT DOCUMENTS

| | | | |
|---|---|---|---|
| 4,200,861 A | 4/1980 | Hubach et al. |
| 4,331,955 A | 5/1982 | Hansen |
| 4,486,785 A | 12/1984 | Lasher et al. |
| 4,580,231 A | 4/1986 | Tidd et al. |
| 4,591,844 A | 5/1986 | Hickin et al. |
| 4,667,247 A | 5/1987 | Karow |
| 4,672,369 A | 6/1987 | Preiss et al. |
| 4,675,830 A | 6/1987 | Hawkins |
| 4,720,705 A | 1/1988 | Gupta et al. |
| 4,780,711 A | 10/1988 | Doumas |
| 4,783,652 A | 11/1988 | Lumelsky |
| 4,827,255 A | 5/1989 | Ishii |
| 4,851,825 A | 7/1989 | Naiman |
| 4,907,282 A | 3/1990 | Daly et al. |
| 4,908,780 A | 3/1990 | Priem et al. |
| 4,945,351 A | 7/1990 | Naiman |
| 5,099,435 A | 3/1992 | Collins et al. |
| 5,132,674 A | 7/1992 | Bottorf |
| 5,241,653 A | 8/1993 | Collins et al. |
| 5,278,678 A | 1/1994 | Harrington |
| 5,299,308 A | 3/1994 | Suzuki et al. |
| 5,301,267 A | 4/1994 | Hassett et al. |
| 5,386,509 A | 1/1995 | Suzuki et al. |
| 5,398,306 A | 3/1995 | Karow |
| 5,459,828 A | 10/1995 | Zack et al. |
| 5,544,294 A | 8/1996 | Cho et al. |
| 5,568,597 A | 10/1996 | Nakayama et al. |
| 5,684,510 A | 11/1997 | Brassell et al. |
| 5,771,048 A | 6/1998 | Nankou et al. |

(Continued)

FOREIGN PATENT DOCUMENTS

DE 69622961 8/2002

(Continued)

OTHER PUBLICATIONS

Platt, John C., Optimal Filtering for Patterned Displays, Microsoft Research, IEEE Signal Processing Letters, vol. 7, No. 7, pp. 179-180 (2000).

(Continued)

*Primary Examiner*—Matthew C. Bella
*Assistant Examiner*—Aaron M. Richer
(74) *Attorney, Agent, or Firm*—Fish & Richardson P.C.

(57) ABSTRACT

Methods, apparatus, including computer program products, and systems implement and use techniques for rendering glyphs. A representation of a glyph is generated, the glyph to be rendered at a size on an output device having a device resolution. A bitmap representation of the glyph is generated using a first anti-aliasing process in a first direction and using a different second anti-aliasing process in a second direction.

24 Claims, 11 Drawing Sheets

U.S. PATENT DOCUMENTS

| | | | |
|---|---|---|---|
| 5,857,067 | A | 1/1999 | Hassett et al. |
| 5,910,805 | A | 6/1999 | Hickey et al. |
| 5,929,866 | A | 7/1999 | Arnold |
| 5,940,080 | A | 8/1999 | Ruehle et al. |
| 5,943,063 | A | 8/1999 | Dowling |
| 6,104,833 | A | 8/2000 | Naoi et al. |
| 6,236,390 | B1 | 5/2001 | Hitchcock |
| 6,282,327 | B1 | 8/2001 | Betrisey et al. |
| 6,342,890 | B1 | 1/2002 | Shetter |
| 6,356,278 | B1 | 3/2002 | Stamm et al. |
| 6,377,262 | B1 | 4/2002 | Hitchcock et al. |
| 6,384,839 | B1 | 5/2002 | Paul |
| 6,438,576 | B1 | 8/2002 | Huang et al. |
| 6,563,502 | B1 | 5/2003 | Dowling et al. |
| 6,614,432 | B1 * | 9/2003 | Merrill ........................ 345/428 |
| 2001/0048764 | A1 | 12/2001 | Betrisey et al. |
| 2002/0093476 | A1 | 7/2002 | Hill et al. |
| 2003/0214513 | A1 * | 11/2003 | Brown et al. ................ 345/611 |
| 2004/0001069 | A1 | 1/2004 | Snyder et al. |

FOREIGN PATENT DOCUMENTS

| | | |
|---|---|---|
| EP | 0 214 547 | 3/1987 |
| EP | 0 397 299 | 11/1990 |
| EP | 0 428 356 | 5/1991 |
| EP | 0 435 391 | 7/1991 |
| EP | 0 468 652 | 1/1992 |
| EP | 0 506 381 A | 9/1992 |
| EP | 0 304 509 | 6/1993 |
| EP | 0 590 923 | 4/1994 |
| EP | 0 654 778 | 5/1995 |
| EP | 0 667 596 | 8/1995 |
| EP | 0 693 740 | 1/1996 |
| EP | 0 772 144 | 5/1997 |
| EP | 1077445 | 2/2001 |
| GB | 2 236 463 | 4/1991 |
| JP | 900039606 | 10/1991 |
| WO | 86/04703 | 8/1986 |
| WO | 94/06094 | 3/1994 |
| WO | 94/29843 | 12/1994 |
| WO | 00/52673 | 9/2000 |

OTHER PUBLICATIONS

Betrisey, et al., 20.4: Displaced Filtering for Patterned Displays, SID 00 Digest, 4 pages.

Microsoft Corporation, What is ClearType? [online], page last updated Jan. 16, 2002, www.microsoft.com/typography/cleartype/what.htm?frame=%208fsize.

Microsoft Corporation, Microsoft ClearType FAQ [online], page last updated Sep. 26, 2002,. http://www.microsoft.com/typography/faq/faq15.htm.

Microsoft Corporation, ClearType Antialiasing, 2003 [online], http://msdn.microsoft.com/library/default.asp?url=/library/en-us/gdi/fonttext-osgn.asp.

Sub-Pixel Font Rendering Technology—Implementation Details, last edit on Dec. 8, 1999 [online], http://grc.com/cttech.htm.

Sub-Pixel Font Rendering Technology—Who Did It First? [online], last edit on Feb. 29, 2000, http://grc.com/ctwho.htm.

Sub-Pixel Font Rendering Technology—How It Works [online], last edit on Feb. 11, 2002, http://grc.com/ctwhat.htm.

Foley et al.; "Computer Graphics Principles and Practice—Second Edition"; Addison-Wesley Publishing Company; 1990; pp. 132-140, pp. 617-646, and pp. 965-979.

"Gasp—Grid-fitting And Scan-conversion Procedure", http://www.microsoft.com/typography/otspec/gast.htm, 1998, 2 pages.

"The TrueType instruction set", http://www.microsoft.com/typography/otspec/ttinst.htm, 1997, Cover sheet (1 page); pp. 181-261.

Sub-Pixel Font Rendering Technology—Who Did It First? [online], last edit on Feb. 29, 2000, http://grc.com/ctwho.htm.

Sub-Pixel Font Rendering Technology—Visitor Dialog Q&A [online] last edit Oct. 4, 2003, http://grc.com/ctdialog.htm.

Foley et al.; "Computer Graphics Principles and Practice--Second Edition";Addison-Wesley Publishing Company; 1990; pp. 584-586, 589-590, 599-600 and 693-695.

SMPTE 170M-1999, SMPTE Standard for Television, "Composite Analog Video Signal—NTSC for Studio Applications," The Society of Motion Picture and Television Engineers.

* cited by examiner

ANISOTROPIC ANTI-ALIASING

BACKGROUND OF THE INVENTION

The present invention relates to rendering glyphs.

A character is an abstract construct that often, although not always, represents an atomic unit in some system of expression, such as a language. Each character can be represented by a set of character attributes that define the semantic information of the character. A character encoding associates the set of character attributes for a character with a particular encoding value—for example, a scalar value included in a character set standard, such as ASCII (American Standard Code for Information Interchanges) or Unicode.

A glyph is a visual representation of a character, such as a graphical token or symbol. A glyph image is a particular image of a glyph that has been rasterized or otherwise imaged onto some display surface. A font is a collection of glyphs, and can include one or more corresponding mapping of glyphs to characters (i.e., to encoding values). A font is typically constructed to support a character set standard. That is, fonts include glyphs representing characters included in the character set standard. A glyph can be associated with a set of glyph attributes defining appearance information for a representation of the corresponding character, and generally provide the information necessary to render the glyph. A glyph can include, or can be associated with, a set of instructions for rendering the glyph. For example, TrueType™ fonts, available from Microsoft Corporation of Redmond, Wash., include glyphs that are associated with a set of instructions for use when rendering the glyph. A TrueType font program can include a component used for font-wide calculations and a per-glyph component for rendering a specific glyph within the font.

Hinting is a method of defining which pixels are turned on in order to create the best possible glyph bitmap shape, particularly at small sizes and low resolutions. A glyph's outline determines which pixels will constitute the bitmap. It is often necessary to modify the outline to create the bitmap, i.e., modify the outline until the desired combination of pixels is turned on. The modified outline can be referred to as a hinted outline. In certain fonts, such as TrueType fonts, a hint is a mathematical instruction that is included in the font program that defines a distortion of a glyph's outline at particular sizes.

Certain types of visual output devices for computer systems are capable of outputting in "gray scale". That is, each of the pixels in the raster matrix of the output device is capable of displaying a number of tones, typically from pure light to pure dark. Anti-aliasing is a technique of varying the gray scale or color values of the pixels representing a glyph image to provide the appearance of smoother curves and less jagged diagonal lines.

FIGS. 1 to 3 illustrate one example of an anti-aliasing procedure. FIG. 1 shows an outline 105 and a hinted outline 110 representative of a glyph image representing the Latin-based character "a". The outline 105 is produced at 4 times the desired size for rendering the glyph. For example, if the desired size is 25 ppem (pixels per em), then the outline is produced for the corresponding glyph at 100 ppem. The glyph image is shown on top of a fine grid 115 and a coarse grid 120, where the ratio of the fine grid resolution to the coarse grid resolution is 4 to 1 in both directions.

The outline 105 of the glyph image can be hinted (i.e., adjusted) relative to the fine grid 115 or the coarse grid 120 to provide the best outline for particular rendering conditions. In the example shown, the outline 105 is hinted relative to the fine grid to produce the hinted outline 110. The hinted outline is then scan converted, that is, converted from an outline to a pixellated representation, at the fine grid resolution to produce a monochrome bitmap 205, shown in FIG. 2, corresponding to a 100 ppem glyph.

Referring to FIG. 3, in this example, the bitmap is downsampled to render a gray scale representation 305 of the glyph. Because the desired size is 4 times less than the size used to produce the hinted outline 110 and resulting monochrome bitmap 205, the downsampling process treats the 100 ppem monochrome bitmap 205 as a 25 ppem high resolution bitmap, where the ratio of the high resolution to the device resolution is 4 to 1 in both directions. That is, the grid 201 shown in FIG. 2 corresponds to the device resolution, which refers to the maximum number of individual pixels that can be displayed on a computer output device used to display the glyph image. The resulting gray scale representation 305 shown in FIG. 3 represents the glyph rendered at the desired 25 ppem size, and is anti-aliased in both directions, evident by the varying tones of gray used for each pixel. The gray tone was determined based on an interpretation of the "high resolution" bitmap 205.

The anti-aliasing procedure described above is isotropic, in the sense that the "degree" of anti-aliasing is the same in both the x and y directions. One existing approach to anisotropic rendering is to anti-alias to some degree in the x direction without anti-aliasing to any degree in the y direction, to generate a high resolution bitmap representation of a glyph. The ratio of the high resolution to the device resolution is 6 to 1 in the x direction and 1 to 1 in the y direction.

SUMMARY OF THE INVENTION

In general, in one aspect, the invention features methods, apparatus (including computer program products) and systems, implementing techniques for rendering glyphs. The techniques include generating a representation of a glyph that is to be rendered at a size on an output device having a device resolution. A bitmap representation of the glyph is generated using a first anti-aliasing process in a first direction and using a different second anti-aliasing process in a second direction.

Implementations of the invention can include one or more of the following. Generating a bitmap representation of the glyph can include generating a representation of an outline of the glyph at the size at which the glyph is to be rendered, and scan converting the representation of the outline to generate the bitmap representation of the glyph at a high resolution. The ratio of the high resolution to the device resolution is m to 1 in the first direction and (n*p) to 1 in the second direction and where m and (n*p) have values greater than 1, m is not equal to (n*p), and p has a value greater than or equal to one.

Generating a representation of the outline of the glyph can include generating a representation of a hinted outline of the glyph, wherein hinting in the first direction adjusts the outline representation to the nearest 1/m of a device pixel and hinting in the second direction adjusts the outline representation to the nearest 1/n of a device pixel. Generating a representation of the outline of the glyph can further include scaling the representation of the hinted outline of the glyph by a factor of p in the second direction.

Alternatively, generating a bitmap representation of the glyph can include generating a representation of an outline of the glyph at a size that is larger than the size at which the glyph is to be rendered by a factor m in the first direction and by a factor (n*p) in the second direction, where m and (n*p) are not equal to one another and are greater than one and where p is greater than or equal to one. The representation of the outline is scan converted to generate the bitmap representation of the glyph at a high resolution, where a ratio of the high resolution to the device resolution is m to 1 in the first direction and (n*p) to 1 in the second direction. Generating a representation of the outline of the glyph can include generating a representation of a hinted outline of the glyph, and can further include scaling the representation of the hinted outline of the glyph by a factor of p in the second direction. The high resolution bitmap representation can be mapped to a bitmap representation at the device resolution to render an image of the glyph on the output device.

In one implementation, m has a value of 8, n has a value of 1 and p has a value of 2. In another implementation, m has a value of 8, n has a value of 2 and p has a value of 1. In yet another implementation, m has a value of 6, n has a value of 1, and p has a value of 2. Other values of m, n and/or p are possible.

The first direction can be the x direction and the second direction can be the y direction in an x-y plane. Alternatively, the first direction can be the y direction and the second direction can be the x direction in an x-y plane. The glyph can be included in a font, including a TrueType font or a Type 1 font available from Adobe Systems Incorporated of San Jose, Calif.

Implementations of the invention can include one or more of the following advantageous features. Using an anti-aliasing procedure to render a glyph image produces the appearance of smoother curves and less jagged diagonals. Providing some degree of anti-aliasing in two directions provides these benefits in both directions. Providing different degrees of anti-aliasing in each direction (i.e., anisotropic anti-aliasing) provides for the maintenance of a hard-edge in one direction, while still allowing for anti-aliasing in that direction. A hard-edge in one direction can be maintained by producing a hinted outline using a fine grid having a resolution equal to the coarse grid resolution in that direction. The hinted outline can subsequently be scaled in the relevant direction before scan conversion, to allow for anti-aliasing in that direction.

The outline representation of the glyph used to generate a bitmap can be produced at the same size as the size at which the glyph is to be rendered on an output device. Accordingly, the appropriate instructions, e.g., hint instructions, for the size at which the glyph is to be rendered are used to produce the outline representation, which is particularly advantageous for certain fonts, such as TrueType fonts.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Anisotropic anti-aliasing techniques according to the present invention include techniques in which a bitmap representation of a glyph is generated by anti-aliasing to some degree in the x direction and to a different degree in the y direction. That is, anti-aliasing occurs in both directions, but not to the same degree. Thus, an anti-aliasing process is used in the x direction, and a different anti-aliasing process is used in the y direction to generate a high resolution bitmap representation of the glyph.

In one implementation, a representation of an outline of a glyph is scan converted to generate a high resolution bitmap representation of the glyph, where the ratio of the high resolution to the device resolution is m to 1 in a first direction and n to 1 in a second direction, where m and n are not equal to one another. Additionally, m and n each have values greater than one, thus providing for at least some anti-aliasing, although to a different "degree", in both directions. For ease of reference, this anisotropic anti-aliasing technique is referred to as m×n anisotropic anti-aliasing.

For certain fonts, such as TrueType fonts, a glyph is rendered based on input parameters relating to the rendering conditions, such as point size, size for rendering (ppem), whether there is any rotation, etc. Accordingly, a change to an input parameter can effect the appearance of the rendered glyph. The isotropic anti-aliasing technique described above uses a representation of the outline of the glyph generated at 4 times the size at which the glyph will be rendered. Thus, the outline is generated based on an input parameter (size at which the glyph will be rendered) that is different from the actual size at which the glyph will be rendered, in this case by a factor of 4. This can have a dramatic effect on the generated outline.

For example, the Parchment TrueType font includes hint instructions to suppress parts of a glyph outline that correspond to an elaborate background at font sizes of 41 ppem and less. That is, a glyph rendered in Parchment font at 40 ppem looks considerably different than a glyph rendered in Parchment font at 60 ppem. If a glyph rendered in Parchment font at 30 ppem was desired, then the anti-aliasing technique described above uses a glyph outline generated at 120 ppem to generate a monochrome bitmap, that the downsampling process interprets as a high resolution bitmap generated at 30 ppem. Although the downsampling process generates a representation of the glyph at 30 ppem, the glyph image includes portions that were not intended to be rendered at that size, i.e., below the 41 ppem threshold for including the elaborate background.

Figure 1:
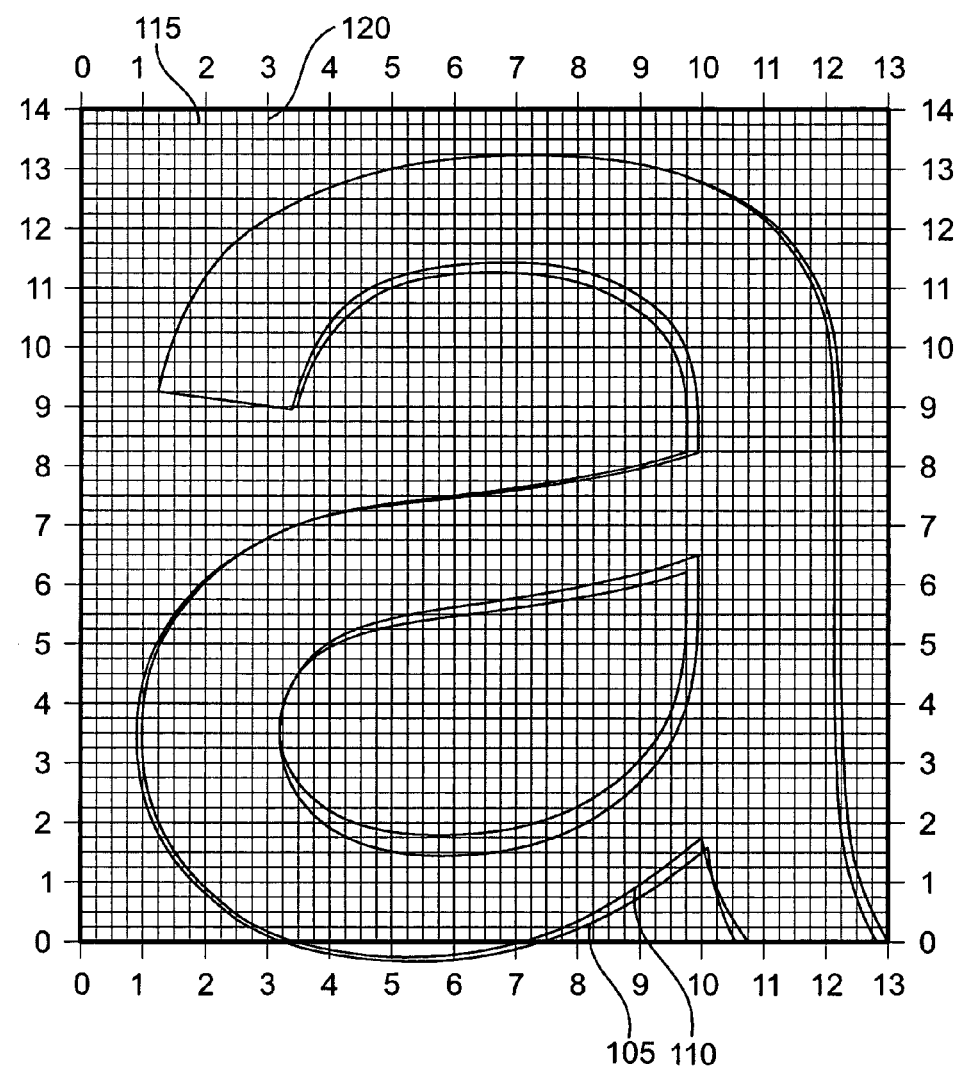
FIG. 1 is a representation of a glyph outline.
Figure 2:
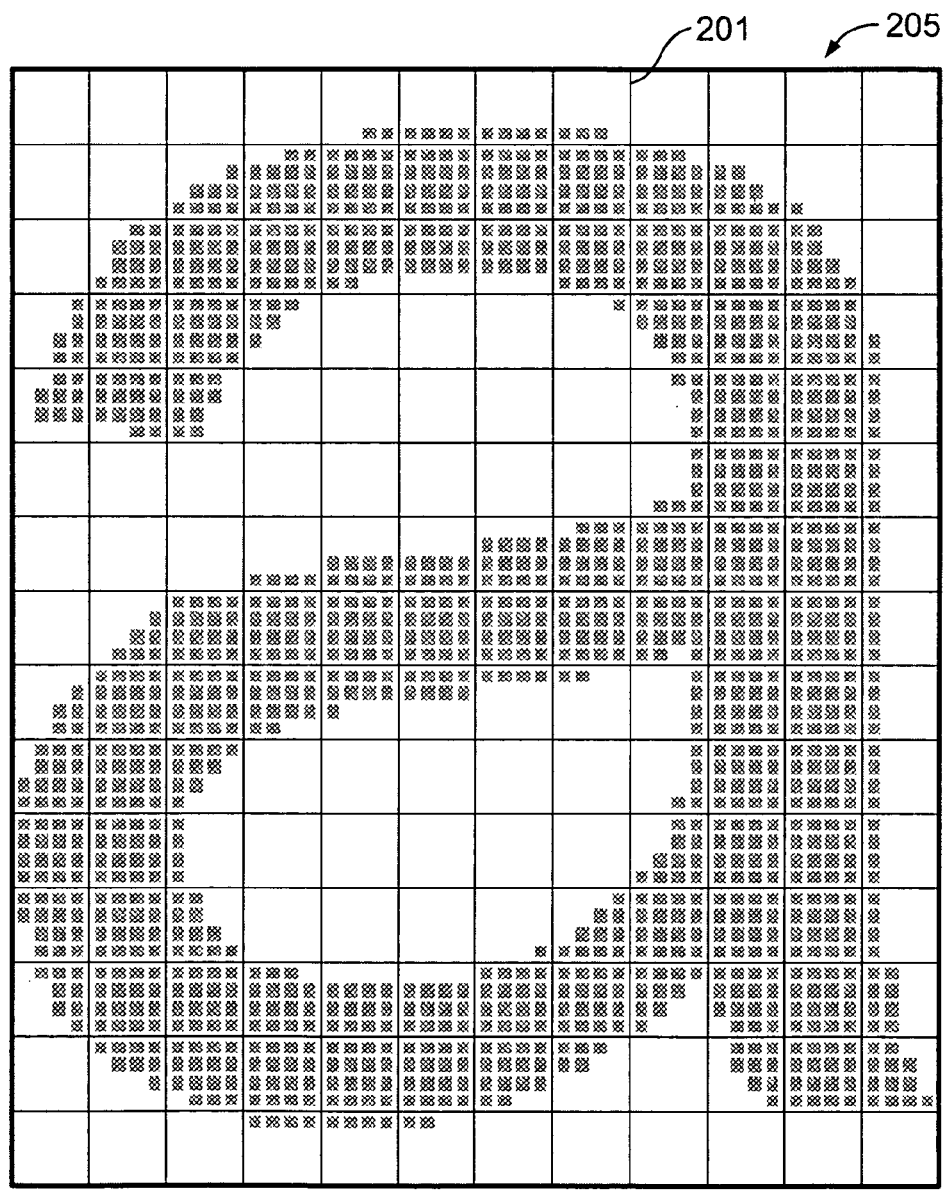
FIG. 2 is a representation of a bitmap.
Figure 3:
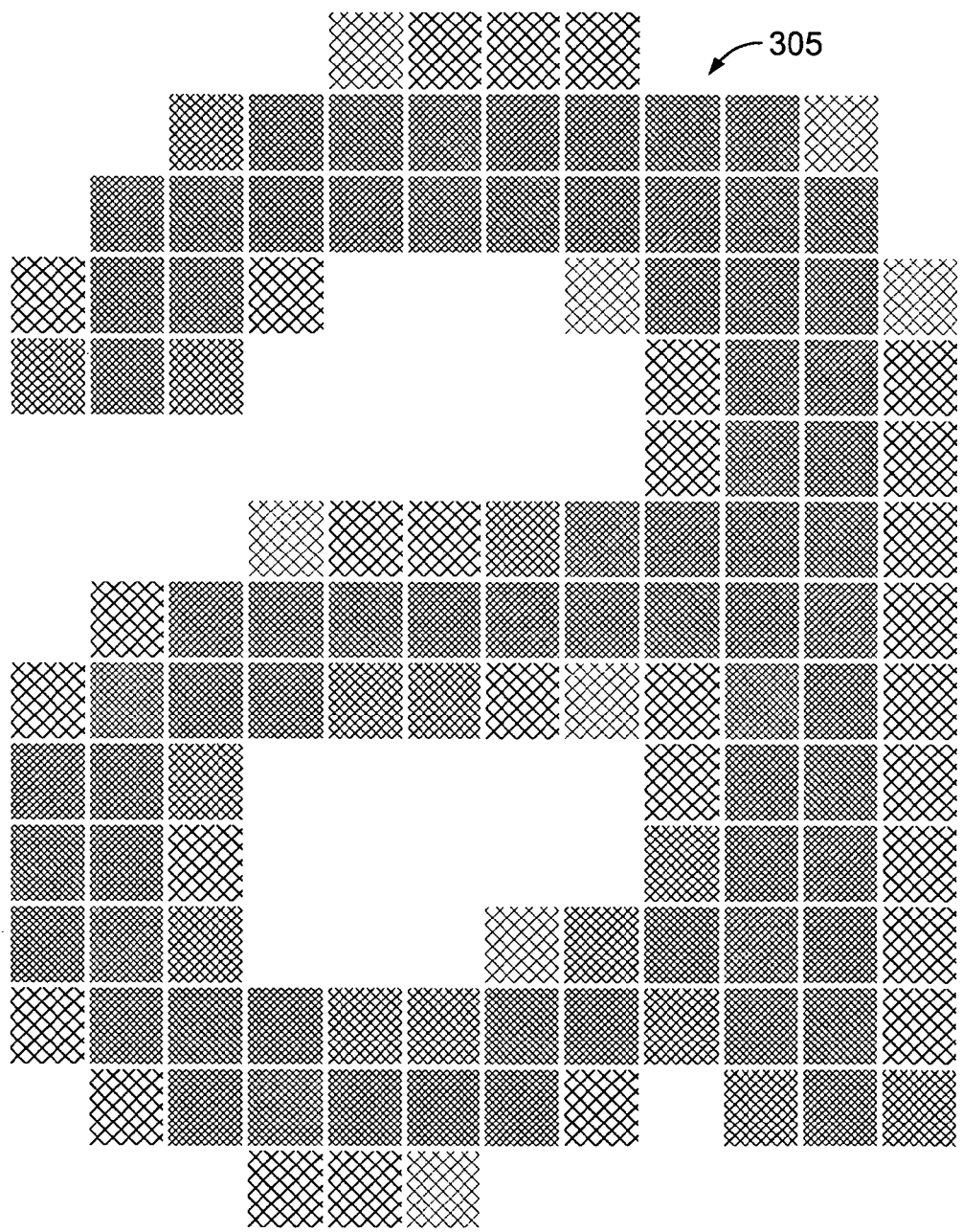
FIG. 3 is a gray scale representation of a glyph produced using an isotropic anti-aliasing procedure.
Figure 4:
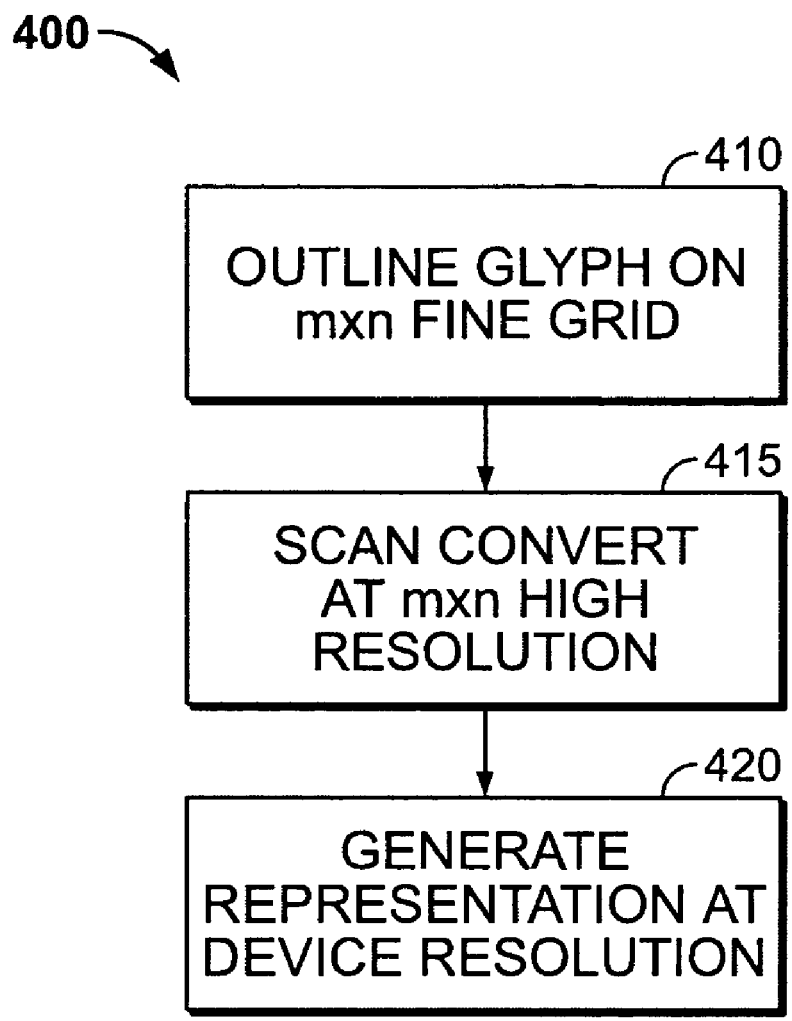
FIG. 4 is a flowchart showing a method for anisotropic anti-aliasing.

These potential problems can be avoided in one implementation of the invention, by generating the outline representation of the glyph at the same size as the glyph is to be rendered. Referring to FIG. 4, a method 400 for m×n anisotropic anti-aliasing is shown. By way of illustrative example, the method 400 is described in the context of generating a high resolution bitmap using 8×2 anisotropic anti-aliasing.

An outline of a glyph is generated at the size at which the glyph will be rendered, in reference to a fine grid having 8 pixels in the x direction and 2 pixels in the y direction for every coarse grid pixel (Step 410). The coarse grid resolution corresponds to the resolution of an output device for displaying the resulting glyph image. Generating the glyph at the size at which the glyph will be rendered ensures that instructions appropriate to that size are used to generate the outline.

The outline can be hinted, for example, by adjusting to the nearest 1/m of a pixel in the x direction and to the nearest 1/n of a pixel in the y direction (i.e., adjusting to the fine grid). In this example, the outline is hinted by adjusting to the nearest $1/8^{th}$ of a pixel in the x direction and to the nearest $1/2$ of a pixel the y direction to generate a hinted outline. Although hinting is not required for anisotropic anti-aliasing, it can provide an improved glyph outline.

The glyph outline is scan converted to produce a high-resolution m×n bitmap (Step 415). In this example, the hinted outline is scan converted at high resolution of 8×2 relative to the device resolution. As such, 0 to 2 fine pixels can be "turned on" in the y direction for every device pixel, and 0 to 8 fine pixels can be turned on in the x direction for every device pixel. Accordingly, there is anti-aliasing in both the x and y directions, although the degree of anti-aliasing, measured in reference to the fine grid used to produce the high resolution bitmap, is less in the y direction than in the x direction. That is, a different anti-aliasing process is used in each direction. In other implementations, n can be greater than m, to produce a higher degree of anti-aliasing in the y direction than in the x direction.

The high resolution bitmap 605 can be mapped to a bitmap at the device resolution to generate a representation of the glyph on an output device (Step 420).

In another implementation, an outline representing a glyph is generated at the same size as the glyph is to be rendered, and is hinted relative to a fine grid having a different resolution than the fine grid that is used to generate the corresponding high resolution bitmap. Using this technique, the outline can be hinted by adjusting the outline to the nearest pixel in one direction, e.g., the y direction (i.e., n=1), and adjusting to the nearest 1/m of a pixel in the other direction, e.g., the x direction. By hinting the outline to the nearest pixel in the y direction, the final rendering will exhibit relatively sharp horizontal edges. However, in order to ensure at least some degree of anti-aliasing in both the x and y directions to smooth curves and diagonals, the hinted outline is scaled by a factor of p, e.g., 2, such that the resulting bitmap representation is generated at a high resolution of m×(n*p) relative to the device resolution, where both m and (n*p) are greater than 1. This alternative anisotropic anti-aliasing procedure is referred to herein as m×(n*p) anisotropic anti-aliasing.

Figure 5:
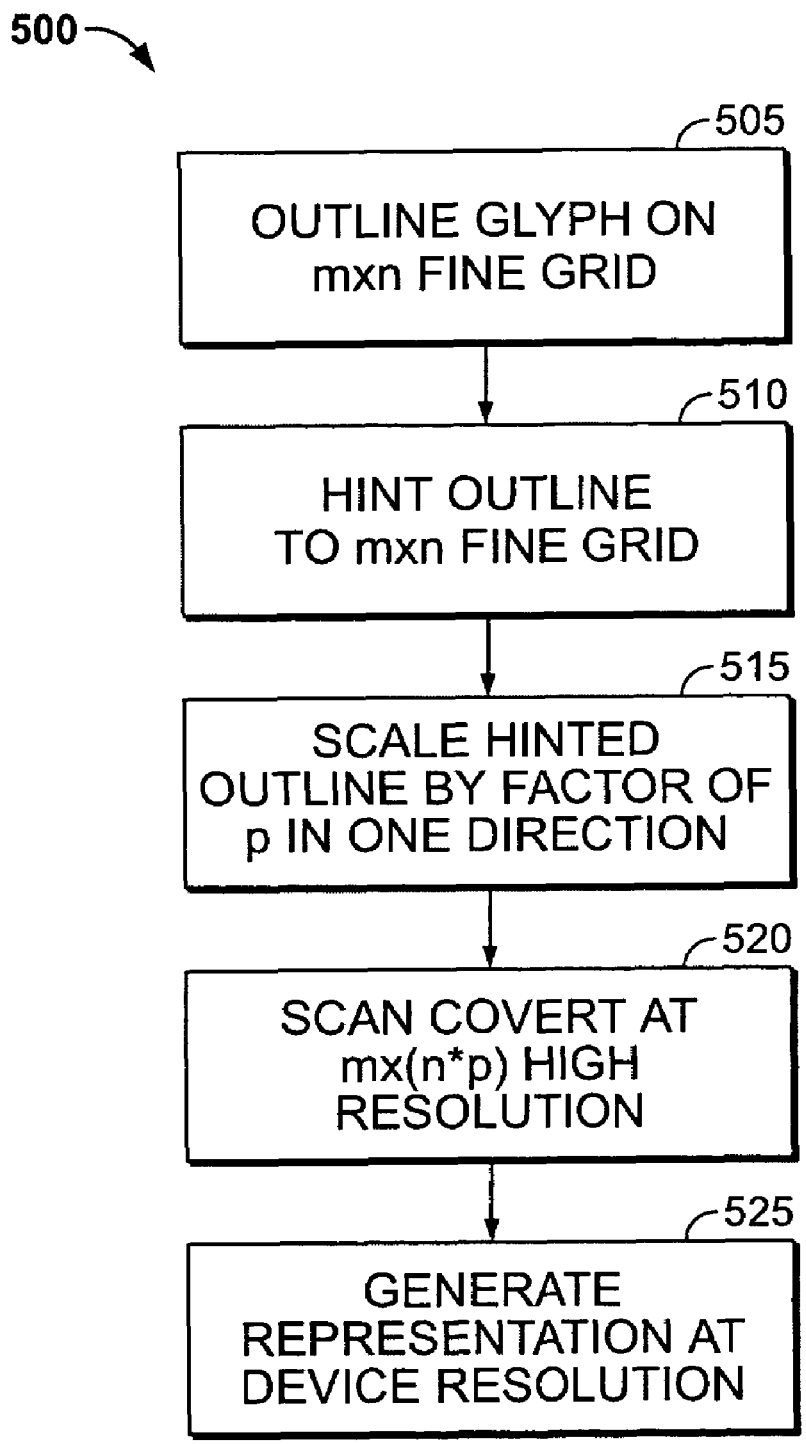
FIG. 5 is a flowchart showing a method for anisotropic anti-aliasing.
Figure 6A:
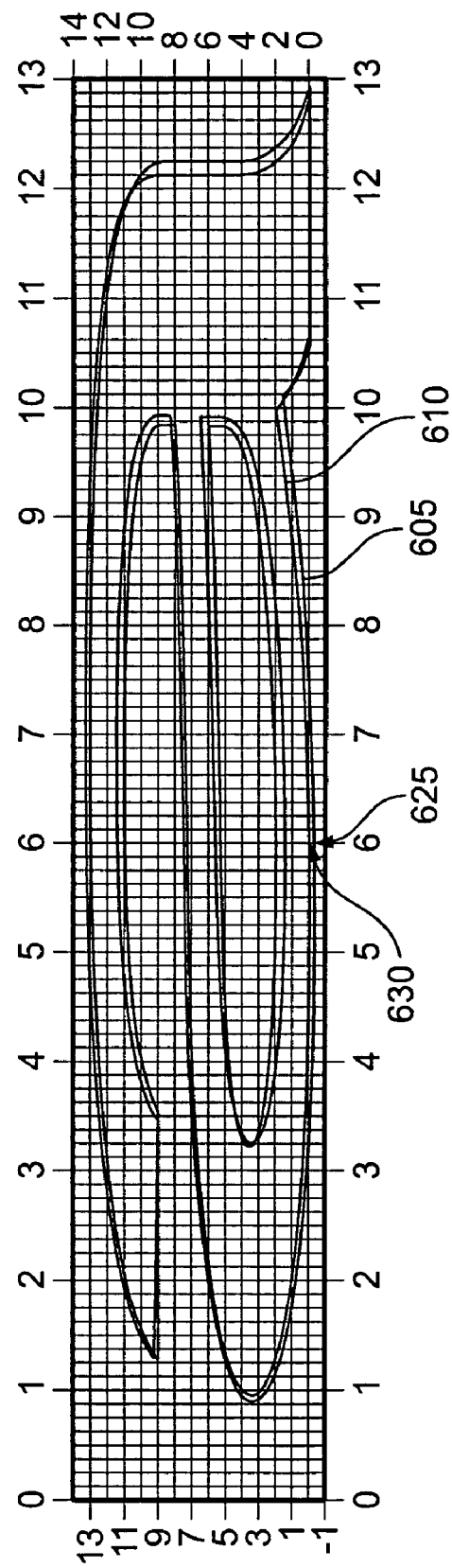
FIG. 6A is a representation of a glyph outline on an 8×1 resolution fine grid.
Figure 6B:
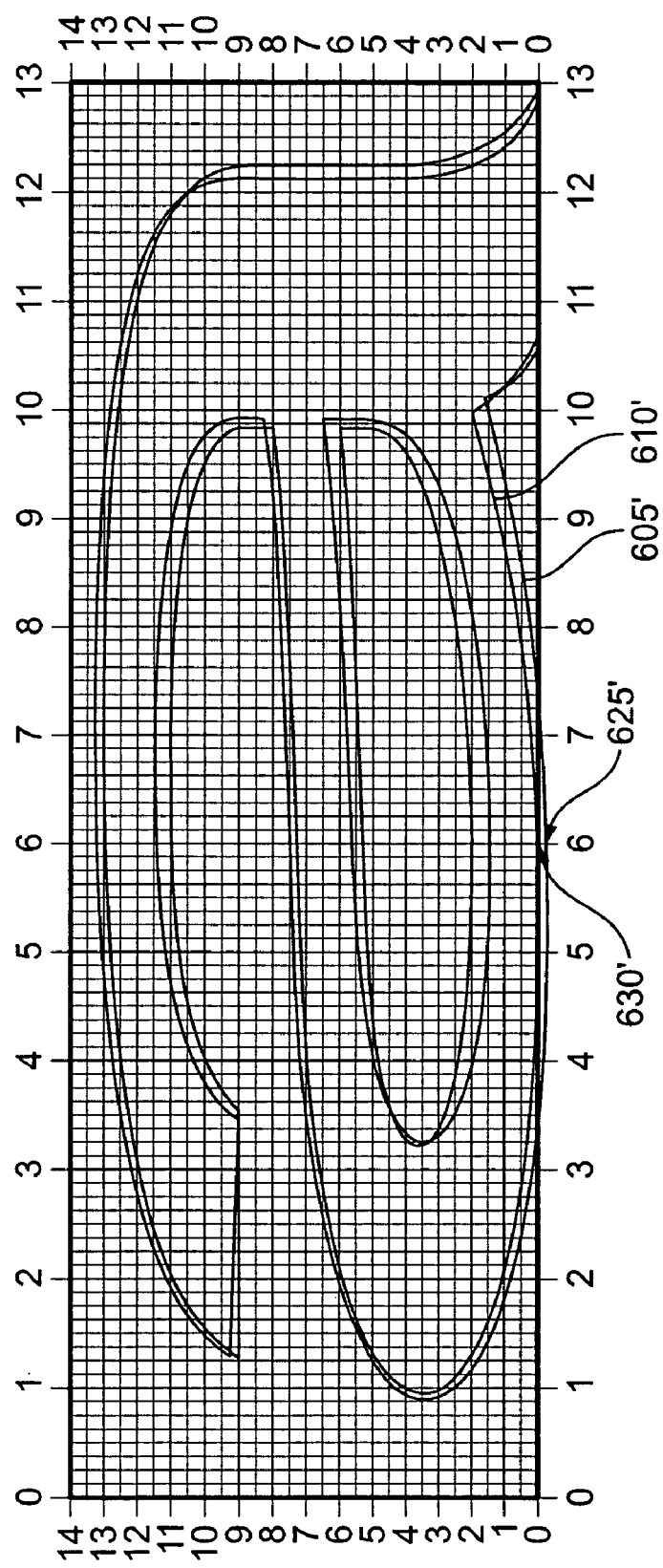
FIG. 6B is a representation of the glyph outline of FIG. 6A scaled in the y direction and shown on an 8×2 resolution fine grid.

Referring to FIG. 5, a method 500 for m×(n*p) anisotropic anti-aliasing is shown. By way of illustrative example, this implementation will be described with respect to FIGS. 6 to 8. The anisotropic anti-aliasing procedure 500 uses a fine grid, having a ratio of m×n fine pixels to each coarse pixel, to generate a representation of an outline a glyph, where m and n are not equal to one another, although one of m or n can be equal to 1 (Step 505). FIG. 6A shows a glyph outline 605 on a fine grid, having a ratio of 8×1 fine pixels to each coarse pixel. That is, m is equal to 8 and n is equal to 1.

The outline can be adjusted to the nearest 1/m of a pixel in a first direction and to the nearest 1/n of a pixel in a second direction (Step 510). Referring to FIG. 6A, the outline 605 is adjusted to the nearest ⅛ of a pixel in the x direction, and to the nearest pixel in the y direction to produce a hinted outline 610. For example, a point 625 on the original outline 605 adjusted to the nearest pixel in the y direction corresponds to a point 630 on the hinted outline 910. The point 630 is aligned with the coarse grid (and the fine grid) in the y direction.

Figure 6C:
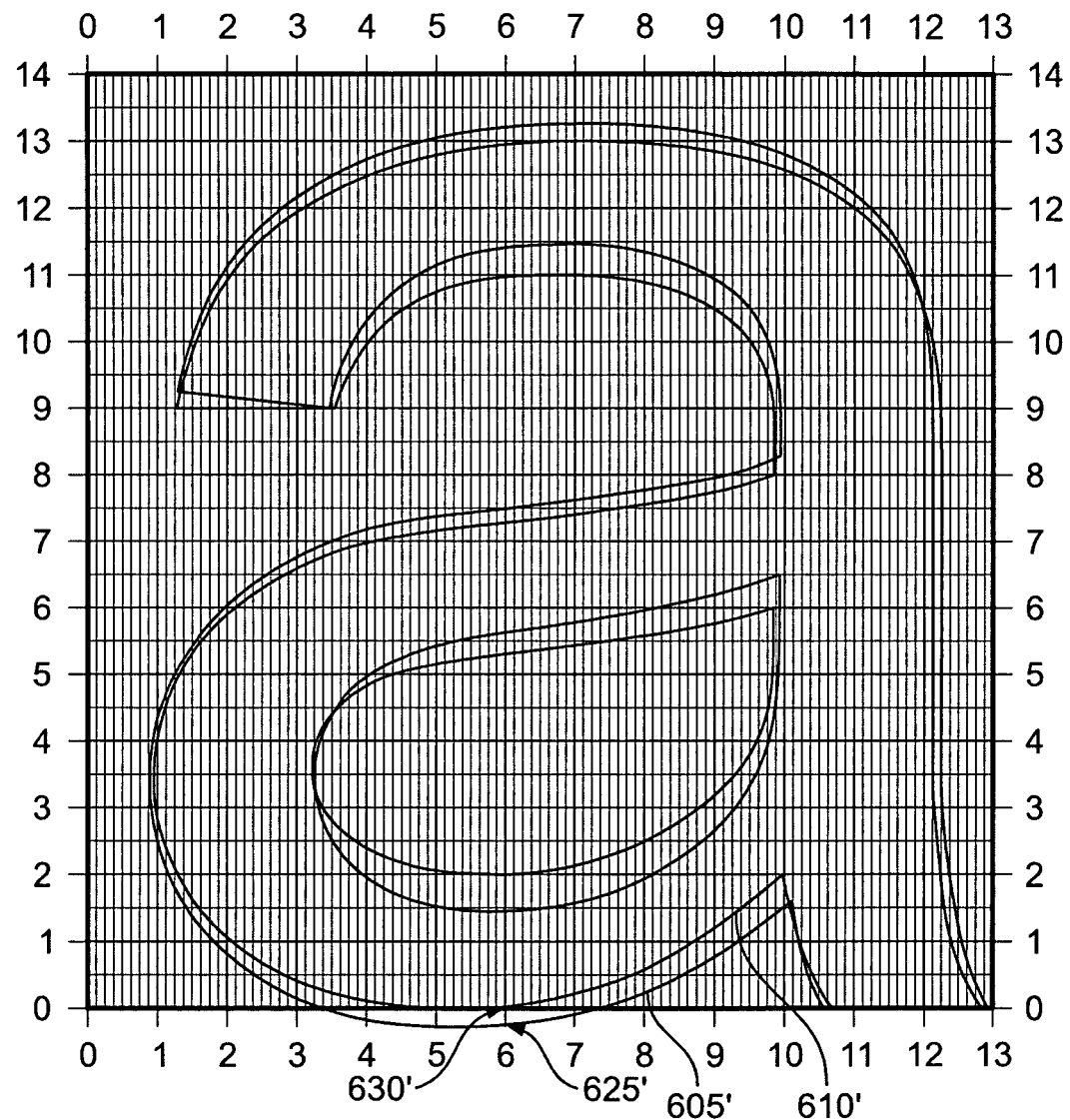
FIG. 6C is a representation of the glyph outline of FIG. 6B.
Figure 7A:
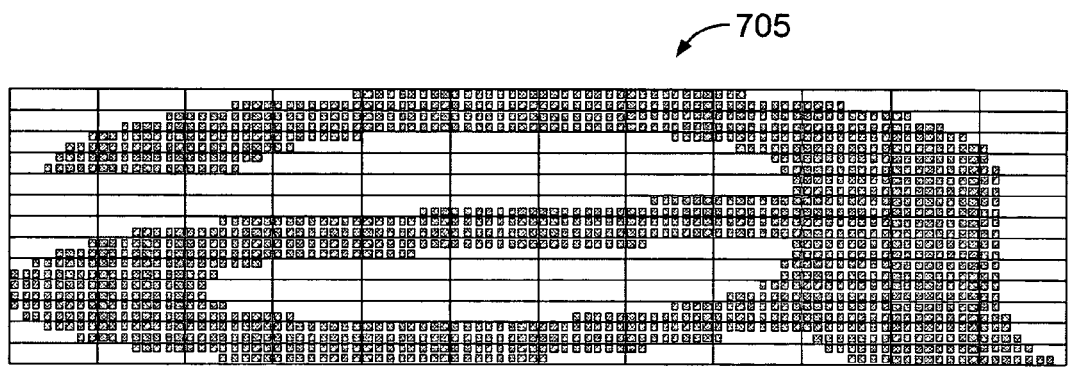
FIG. 7A is a representation of a bitmap on an 8×2 resolution fine grid.

The resulting hinted outline is scaled by a factor of p in the second direction (Step 515). In the example, the hinted outline 610 is scaled by a factor of 2 (i.e., p=2) in the y direction, for example, by multiplying the y coordinates by 2, to produce the hinted outline 610' shown in FIG. 6B. The hinted outline 610' is shown on top of a fine grid having 8 pixels in the x direction and 2 pixels in the y direction for each coarse pixel (i.e. n*p=1*2=2). FIG. 6C is a representation of the hinted outline 610', with each coarse pixel shown as square, for ease of viewing. The scaling does not change the hinting in the x or y directions, and thus the hinted outline remains adjusted to the nearest pixel in the y direction. For example, before hinting, a point 625 on the original outline 605 is not aligned with the coarse grid. However, after hinting a corresponding point 630 on the hinted outline 610 is aligned with the coarse grid. The corresponding point 630' on the scaled hinted outline 610' remains aligned with the coarse grid.

Figure 7B:
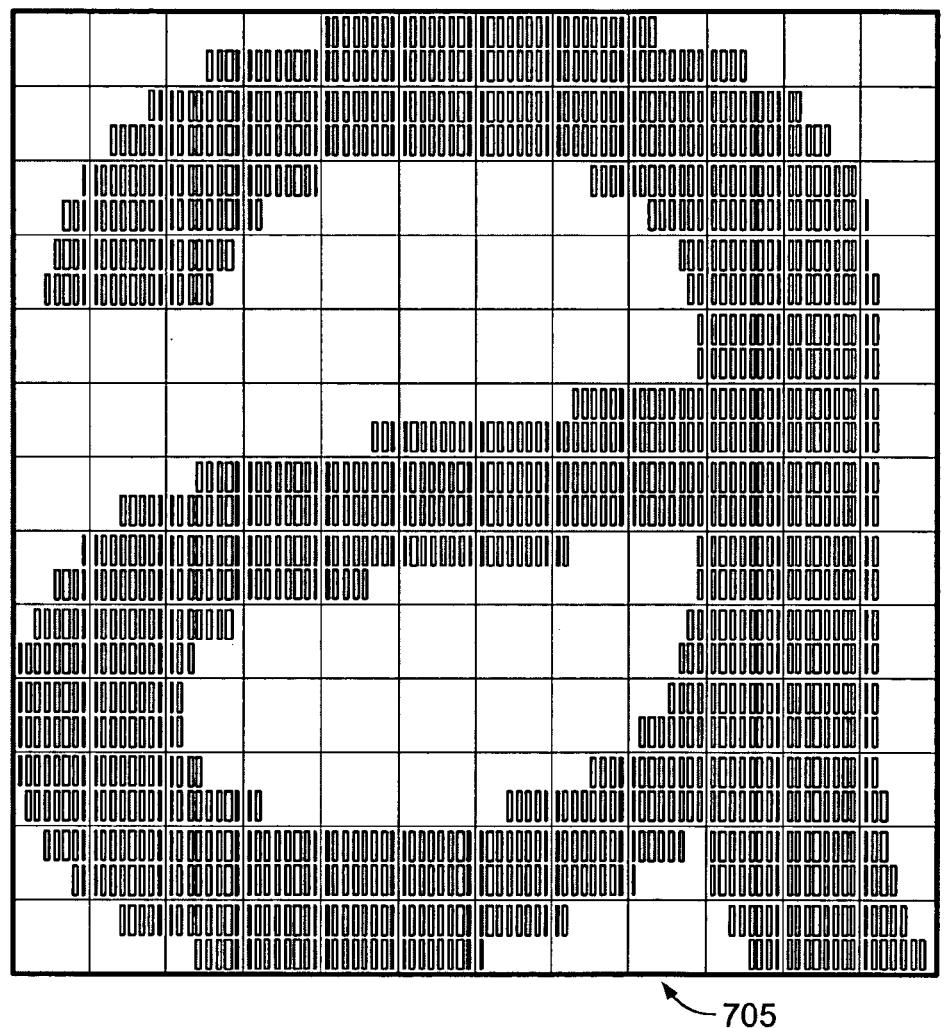
FIG. 7B is a representation of the bitmap of FIG. 7A.
Figure 8:
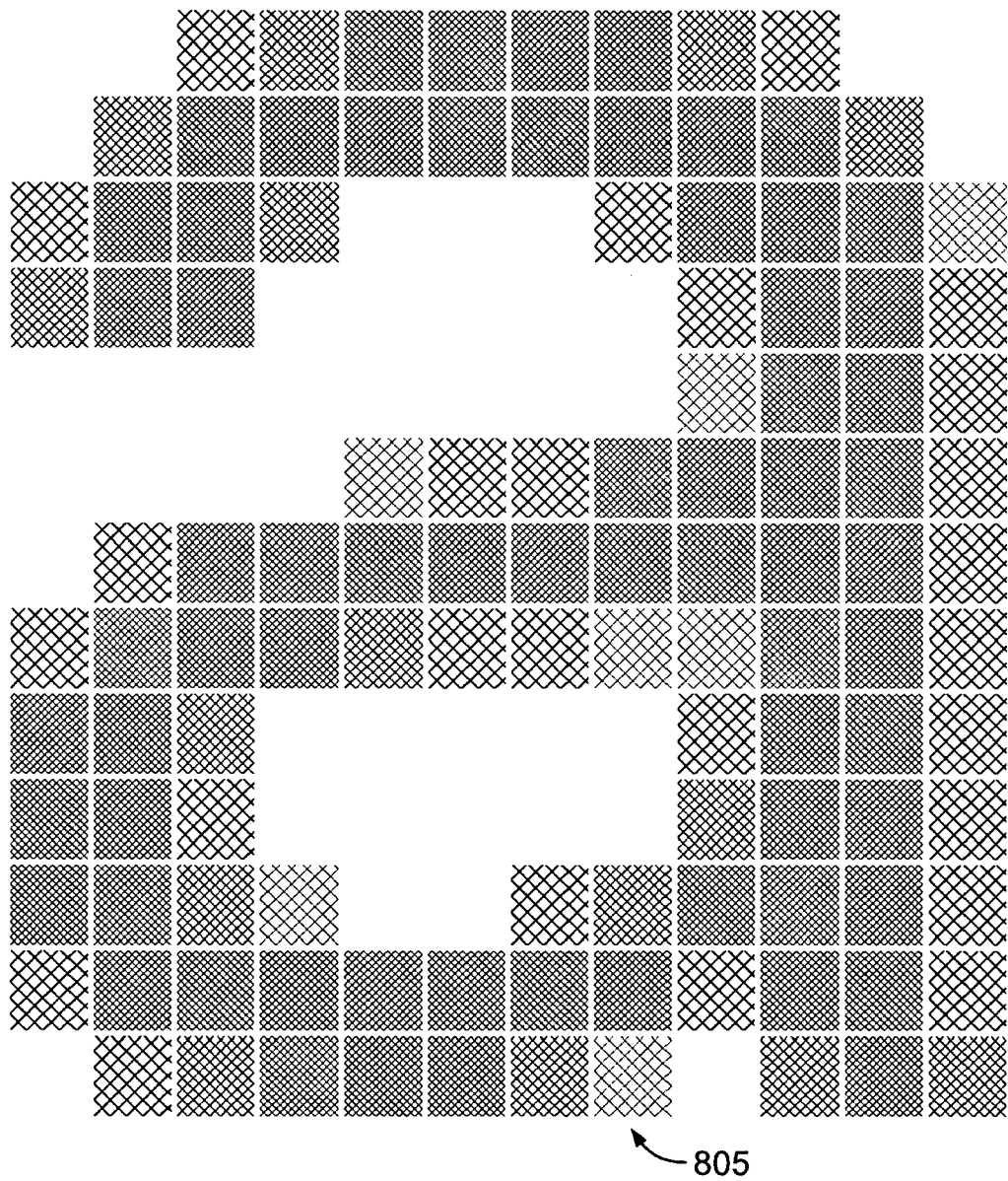
FIG. 8 is a gray scale representation of a glyph rendered using an anisotropic anti-aliasing procedure.

The scaled hinted outline 610' is scan converted to produce a high resolution bitmap (step 520). The resulting high resolution bitmap is therefore produced at a resolution of m×(n*p) fine pixels per device pixel. In the example, the scaled hinted outline 610', is scan converted to produce a high resolution bitmap 705, shown in FIG. 7A. FIG. 7B shows a representation of the bitmap 705 with each coarse pixel shown as square, for ease of viewing. As shown in FIGS. 7A and 7B, 0 to 2 fine pixels can be "turned on" in the y direction for every coarse pixel, and 0 to 8 fine pixels can be turned on in the x direction for every coarse pixel. Accordingly, there is anti-aliasing in both the x and y directions, although the degree of anti-aliasing, measured in reference to the fine grid used to produce the high resolution bitmap, is less in the y direction than in the x direction.

The bitmap can be mapped to a bitmap having the device resolution to generate a representation of the glyph image on an output device (Step 525). For example, the bitmap 610' can be downsampled to render a gray scale representation 805 of the glyph, shown in FIG. 8. The effect of producing the hinted outline by adjusting to an 8×1 fine grid is illustrated by the gray scale representation 805. The edges 810, 812, 823, 825 of the horizontal stems are black (i.e., hard-edges), which is attributable to adjusting the original outline 605 to the nearest pixel to produce the hinted outline 610.

Certain fonts, for example, Type 1 fonts, generate an outline representing a glyph independent of the size at which the glyph will rendered. Accordingly, the problem discussed above in reference to the TrueType Parchment font, for example, does not arise. For these types of fonts, the following implementation can be used. In this implementation, an outline of the glyph is generated at a size that is larger than the size at which the glyph is to be rendered by a factor of m in the first direction and by a factor of n in the second direction. Both m and n are greater than one and are not equal to one another.

The large sized glyph outline can be hinted according to techniques known in the art, for example, using techniques described in U.S. Pat. Nos. 5,943,063, 6,563,502 and U.S. patent application Ser. No. 09/739,587, all of which are incorporated by reference herein. The hinted outline is scan converted to generate a monochrome bitmap corresponding to a glyph m times larger in the first direction and n times larger in the second direction. However, as described above in reference to 4×4 isotropic anti-aliasing, the bitmap can be interpreted as a high resolution bitmap for the glyph generated at the size at which the glyph is to be rendered, where the ratio of the high resolution to the device resolution is m to 1 in the first direction and n to 1 in the second direction. Accordingly, the high resolution bitmap for the glyph (at the size at which the glyph is to be rendered) is anti-aliased in both directions, although to a different degree in each direction.

Similarly, m×(n*p) anisotropic anti-aliasing can be implemented by generating an outline of a glyph at a size that is larger than the size at which the glyph is to be rendered by a factor of m in the first direction and by a factor of (n*p) in the second direction. Both m and (n*p) are greater than one and are not equal to one another, and p is greater than or equal to one.

The large sized glyph outline can be hinted, and then scaled in the second direction by a factor of p. The scaled hinted outline is scan converted to generate a monochrome bitmap corresponding to a glyph m times larger in the first direction and (n*p) times larger in the second direction. The bitmap can be interpreted as a high resolution bitmap for the glyph generated at the size at which the glyph is to be rendered, where the ratio of the high resolution to the device resolution is m to 1 in the first direction and (n*p) to 1 in the second direction. The high resolution bitmap for the glyph (at the size at which the glyph is to be rendered) is anti-aliased in both directions, although to a different degree in each direction.

The values of n, m and p should be selected taking into consideration how the resulting high resolution bitmap will be filtered. For example, if the bitmap will be filtered to produce a gray scale image on an output device capable of displaying 17 shades of gray, then 8×2 anisotropic anti-aliasing using an 8×1 hinted outline, as described above, may be preferable. As another example, if the bitmap will be filtered to produce a color image on an LCD output device comprised of individually addressable red, green and blue sub-pixels, then it may be preferable to use an m value that is a multiple of 3 (where the first direction is the x direction), such as 6×2 anisotropic anti-aliasing using a 6×1 hinted outline. Techniques for downsampling the high resolution bitmap can include those described in U.S. Pat. No. 5,929,866 and U.S. patent application Ser. No. 09/785,840, both of which are incorporated by reference herein.

Any number of other implementations are possible, by varying the values for m, n and p. In one implementation, m, n and p can be defined based on user input.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention has been described in terms of particular embodiments. Other embodiments are within the scope of the following claims. For example, the steps of the invention can be performed in a different order and still achieve desirable results. Although the examples above described m×n and m×(n*p) anisotropic anti-aliasing in the context of high resolution bitmap having a higher resolution in the x direction than the y direction, the techniques can be implemented with a vertical orientation, such that a high resolution bitmap has a higher resolution in the y (vertical) direction than the x (horizontal) direction.

What is claimed is:

1. A computer-implemented method for generating a representation of a glyph, the glyph to be rendered at a size on an output device having a device resolution comprising:

generating a bitmap representation of the glyph using a first anti-aliasing process in a first direction and using a different second anti-aliasing process in a second direction, where generating a bitmap representation of the glyph includes:

generating a representation of a hinted outline of the glyph at the size, where hinting in the first direction adjusts the outline representation to the nearest 1/m of a device pixel and hinting in the second direction adjusts the outline representation to the nearest 1/n of a device pixel:

scaling the representation of the hinted outline of the glyph by a factor of p in the second direction: and scan converting the representation of the outline to generate the bitmap representation of the glyph at a high resolution, where a ratio of the high resolution to the device resolution is m to 1 in the first direction and (n*p) to 1 in the second direction and where m and (n*p) have values greater than 1, m is not equal to (n*p), and p has a value greater than one.

2. The method of claim 1, wherein m has a value of 8, n has a value of 1 and p has a value of 2.

3. The method of claim 1, wherein m has a value of 6, n has a value of 1, and p has a value of 2.

4. The method of claim 1, wherein the first direction is the x direction and the second direction is the y direction in an x-y plane.

5. The method of claim 1, wherein the first direction is the y direction and the second direction is the x direction in an x-y plane.

6. The method of claim 1, wherein the glyph is included in a TrueType font.

7. A computer-implemented method for generating a representation of a glyph, the glyph to be rendered at a size on an output device having a device resolution, comprising generating a bitmap representation of the glyph using a first anti-aliasing process in a first direction and using a different second anti-aliasing process in a second direction, where generating a bitmap representation of the glyph includes:
generating a representation of an outline of the glyph at a size that is larger than the size at which the glyph is to be rendered by a factor m in the first direction and by a factor (n*p) in the second direction, where m and (n*p) are not equal to one another and are greater than one and where p is greater than one, including generating a representation of a hinted outline of the glyph;
scaling the representation of the hinted outline of the glyph by a factor of p in the second direction; and
scan converting the representation of the outline to generate the bitmap representation of the glyph at a high resolution, where a ratio of the high resolution to the device resolution is m to 1 in the first direction and (n*p) to 1 in the second direction.

8. The method of claim 7, wherein m has a value of 8, n has a value of 1, and p has a value of 2.

9. The method of claim 7, wherein m has a value of 6, n has a value of 1, and p has a value of 2.

10. The method of claim 7, wherein the first direction is the x direction and the second direction is the y direction in an x-y plane.

11. The method of claim 7, wherein the first direction is the y direction and the second direction is the x direction in an x-y plane.

12. The method of claim 7, wherein the glyph is included in a Type 1 font.

13. A computer program product, tangibly stored on a computer-readable medium, for generating a representation of a glyph, the glyph to be rendered at a size on an output device having a device resolution, comprising instructions operable to cause a programmable processor to:
generate a bitmap representation of the glyph using a first anti-aliasing process in a first direction and using a different second anti-aliasing process in a second direction, where instructions operable to generate a bitmap representation of the glyph include instructions operable to:
generate a representation of a hinted outline of the glyph at the size, wherein hinting in the first direction adjusts the outline representation to the nearest 1/m of a device pixel and hinting in the second direction adjusts the outline representation to the nearest 1/n of a device pixel;
scale the representation of the hinted outline of the glyph by a factor of p in the second direction; and
scan convert the representation of the outline to generate the bitmap representation of the glyph at a high resolution, where a ratio of the high resolution to the device resolution is m to 1 in the first direction and (n*p) to 1 in the second direction and where m and (n*p) have values greater than 1, m is not equal to (n*p), and v has a value greater than one.

14. The computer program product of claim 13, wherein m has a value of 8, n has a value of 1 and p has a value of 2.

15. The computer program product of claim 13, wherein m has a value of 6, n has a value of 1, and p has a value of 2.

16. The computer program product of claim 13, wherein the first direction is the x direction and the second direction is the y direction in an x-y plane.

17. The computer program product of claim 13, wherein the first direction is the y direction and the second direction is the x direction in an x-y plane.

18. The computer program product of claim 13, wherein the glyph is included in a TrueType font.

19. A computer program product, tangibly stored on a computer-readable medium, for generating a representation of a glyph, the glyph to be rendered at a size on an output device having a device resolution, comprising instructions operable to cause a programmable processor to generate a bitmap representation of the glyph using a first anti-aliasing process in a first direction and using different second anti-aliasing process in a second direction, where instructions operable to generate a bitmap include instructions operable to:
generate a representation of an outline of the glyph at a size that is larger than the size at which the glyph is to be rendered by a factor m in the first direction and by a factor (n*p) in the second direction, where m and (n*p) are not equal to one another and are greater than one and where p is greater than one, including instructions operable to generate a representation of a hinted outline of the glyph;
scale the representation of the hinted outline of the glyph by a factor of p in the second direction; and
scan convert the representation of the outline to generate the bitmap representation of the glyph at a high resolution, where a ratio of the high resolution to the device resolution is m to 1 in the first direction and (n*p) to 1 in the second direction.

20. The computer program product of claim 19, wherein m has a value of 8, n has a value of 1 and p has a value of 2.

21. The computer program product of claim 19, wherein m has a value of 6, n has a value of 1, and p has a value of 2.

22. The computer program product of claim 19, wherein the first direction is the x direction and the second direction is the y direction in an x-y plane.

23. The computer program product of claim 19, wherein the first direction is the y direction and the second direction is the x direction in an x-y plane.

24. The computer program product of claim 19, wherein the glyph is included in a Type 1 font.

* * * * *

UNITED STATES PATENT AND TRADEMARK OFFICE
CERTIFICATE OF CORRECTION

| | | |
|---|---|---|
| PATENT NO. | : 7,006,107 B2 | Page 1 of 1 |
| APPLICATION NO. | : 10/440013 | |
| DATED | : February 28, 2006 | |
| INVENTOR(S) | : Terence S. Dowling and R. David Arnold | |

It is certified that error appears in the above-identified patent and that said Letters Patent is hereby corrected as shown below:

Column 10, line 9, please delete "and v" and replace with --and p--.

Signed and Sealed this

Fifteenth Day of August, 2006

JON W. DUDAS
*Director of the United States Patent and Trademark Office*